United States Patent
Yadav et al.

(10) Patent No.: US 10,142,923 B2
(45) Date of Patent: Nov. 27, 2018

(54) USING A SINGLE PACKET DATA NETWORK FOR DATA TRANSFERS TO MANAGE NETWORK RESOURCES

(71) Applicant: Microsoft Technology Licensing, LLC, Redmond, WA (US)

(72) Inventors: Mahesh Yadav, Redmond, WA (US); Srinivasa L. Rao, Redmond, WA (US); Darene Brice Lewis, Bothell, WA (US); Jean Khawand, Sammamish, WA (US); Shivam K. Shah, Redmond, WA (US); Charbel Khawand, Sammamish, WA (US); Tae Hwan Jung, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 15/054,944

(22) Filed: Feb. 26, 2016

(65) Prior Publication Data
US 2017/0251426 A1    Aug. 31, 2017

(51) Int. Cl.
*H04W 48/18* (2009.01)
*H04W 36/00* (2009.01)

(52) U.S. Cl.
CPC ....... *H04W 48/18* (2013.01); *H04W 36/0027* (2013.01)

(58) Field of Classification Search
CPC .......................... H04W 48/18; H04W 36/0027
See application file for complete search history.

(56) References Cited

U.S. PATENT DOCUMENTS

| 8,358,602 | B2 | 1/2013 | Puthiyandyil et al. |
| 8,588,850 | B1 | 11/2013 | Venkataramu |
| 8,971,244 | B2 | 3/2015 | Zhao et al. |
| 9,137,833 | B2 | 9/2015 | Naoe et al. |
| 2012/0257598 | A1 | 10/2012 | Karampatsis et al. |
| 2012/0314562 | A1 | 12/2012 | Zhao et al. |

(Continued)

FOREIGN PATENT DOCUMENTS

| WO | 2011133585 A1 | 10/2011 |
| WO | 2013170211 A1 | 11/2013 |
| WO | 2014098492 A1 | 6/2014 |

OTHER PUBLICATIONS

Vaidya, et al., "Network Congestion Control: Mechanisms for Congestion Avoidance and Recovery", In Proceedings of the 1st International Conference on Wireless Technologies for Humanitarian Relief, Dec. 18, 2011, pp. 199-207.

(Continued)

*Primary Examiner* — Charles C Jiang
*Assistant Examiner* — Saad Khawar

(57) ABSTRACT

Examples of the disclosure enable packet data access to be managed. In some examples, a device is coupled to a wireless network using a first access point name (APN). The wireless network includes a first packet data network (PDN) corresponding to the first APN and a second PDN. A request to couple the device to the wireless network using a second APN corresponding to the second PDN is received. When the device is configured to use a single PDN, a first instruction associated with decoupling the device from the wireless network is transmitted to the first PDN, and a second instruction associated with coupling the device to the wireless network using the second APN is transmitted to the second PDN. Aspects of the disclosure enable controlling or restricting packet data access to manage network resources.

20 Claims, 8 Drawing Sheets

(56) References Cited

U.S. PATENT DOCUMENTS

| | | | |
|---|---|---|---|
| 2013/0016668 A1 | 1/2013 | Zhao et al. | |
| 2013/0044679 A1 | 2/2013 | Rathonyi et al. | |
| 2013/0286828 A1* | 10/2013 | Cho | H04W 28/02 370/230 |
| 2013/0301547 A1* | 11/2013 | Gupta | H04W 76/048 370/329 |
| 2013/0337808 A1 | 12/2013 | Zhao et al. | |
| 2014/0119178 A1* | 5/2014 | Zhao | H04W 28/0268 370/230 |
| 2015/0117192 A1* | 4/2015 | Zhang | H04W 48/06 370/230 |
| 2015/0201453 A1 | 7/2015 | Roeland et al. | |
| 2016/0113053 A1* | 4/2016 | Chuang | H04W 76/027 370/329 |
| 2017/0094512 A1* | 3/2017 | Kiss | H04L 63/0853 |

OTHER PUBLICATIONS

Qiong, et al., "Design and realization of PDN connectivity procedure in LTE radio protocol stack", In Proceedings of IEEE 3rd International Conference on Communication Software and Networks, May 27, 2011, pp. 110-113.

"3rd Generation Partnership Project; Technical Specification Group Services and System Aspects; Multi Access PDN Connectivity and IP Flow Mobility (Release 9)", In 3GPP Technical Report No. TR23.861, V1.2.0, May 1, 2009, 48 Pages.

"International Search Report and Written Opinion Issued in PCT Application No. PCT/US2017/018024", dated Jun. 1, 2017, 15 Pages.

\* cited by examiner

USING A SINGLE PACKET DATA NETWORK FOR DATA TRANSFERS TO MANAGE NETWORK RESOURCES

BACKGROUND

Wireless networks may include one or more packet data networks for providing and transferring data. A packet data network connection between a communication device and a packet data network may be used to transfer data between the communication device and the packet data network. Some known communication devices may have multiple packet data network connections with multiple packet data networks. However, at least some known communication devices and/or wireless networks are not configured to efficiently or effectively handle multiple packet data network connections, which may result in an interruption of connectivity when at least some known communication devices initiate and/or have multiple packet data network connections.

Moreover, some known communication devices include applications that may be used to communicate with packet data networks. However, some known applications are configured to use only one packet data network connection at a time. Accordingly, at least some known communication devices including an application that is configured to use only one packet data network connection at a time may inefficiently use and/or occupy network resources when attached to multiple packet data networks.

SUMMARY

Examples of the disclosure enable a single packet data network to be used for data transfers in an efficient and effective manner. In some examples, a wireless communication device is coupled to a wireless network using a first access point name. The wireless network includes a first packet data network corresponding to the first access point name and a second packet data network. A request to couple the wireless communication device to the wireless network using a second access point name corresponding to the second packet data network is received at the wireless communication device. It is determined whether the wireless communication device is selectively configured to use a single packet data network for data transfers. When the wireless communication device is configured to use the single packet data network, a first instruction associated with decoupling the wireless communication device from the wireless network is transmitted to the first packet data network, and a second instruction associated with coupling the wireless communication device to the wireless network using the second access point name is transmitted to the second packet data network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
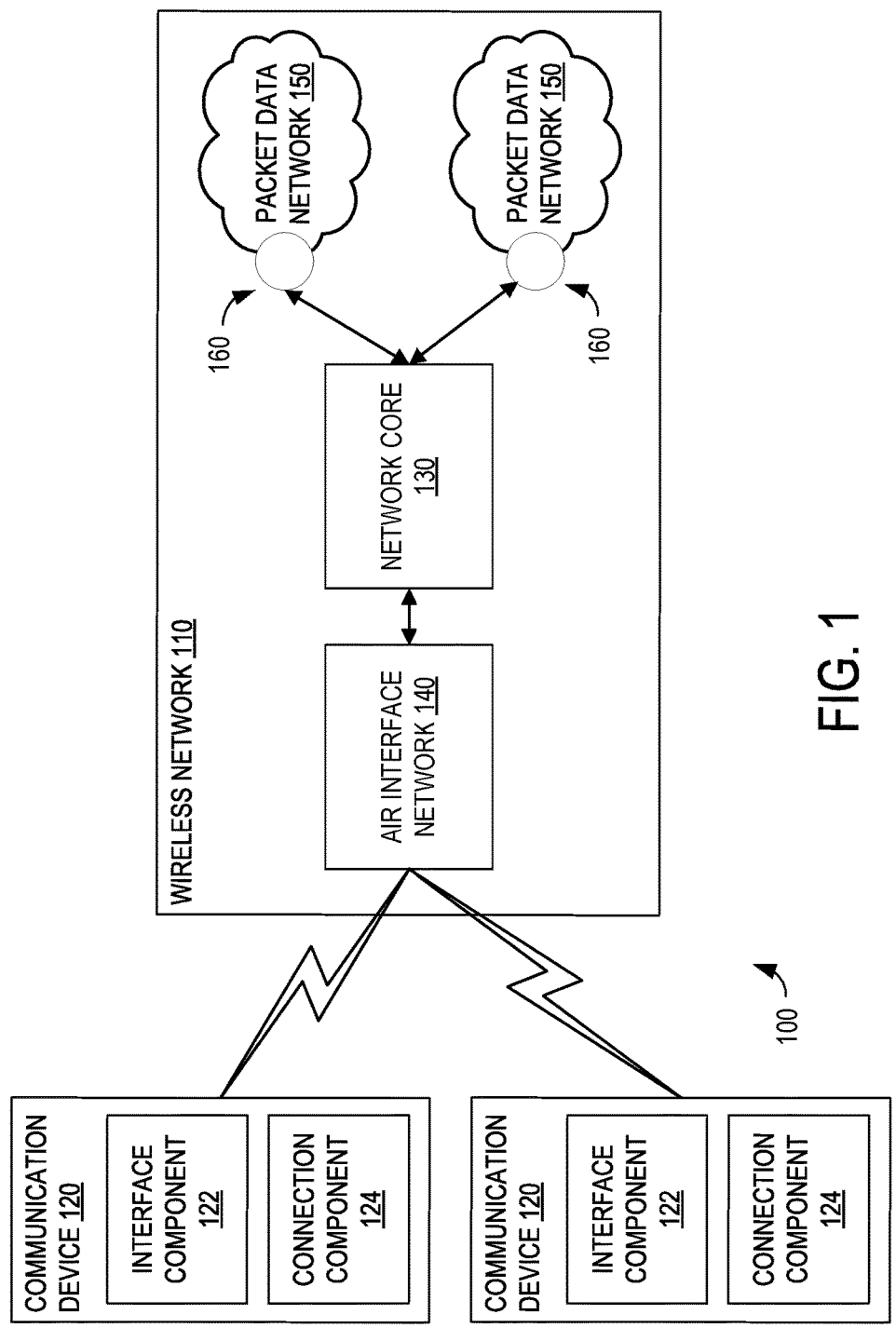
FIG. 1 is a block diagram of an example system for broadband communication.

The subject matter described herein is related generally to broadband communication and, more particularly, to managing packet data access for communication devices. For example, a wireless communication device may be coupled to a wireless network using a first access point name (APN). The wireless network includes a first packet data network (PDN) corresponding to the first APN and a second PDN. A request to couple the wireless communication device to the wireless network using a second APN corresponding to the second PDN is received at the wireless communication device. The second APN may be different from the first APN. It is determined whether the wireless communication device is selectively configured to use a single packet data network for data transfers. When the wireless communication device is configured to use the single packet data network, a first instruction associated with decoupling the wireless communication device from the wireless network is transmitted to the first PDN, and a second instruction associated with coupling the wireless communication device to the wireless network using the second APN is transmitted to the second PDN.

The examples described herein enable network resources to be managed in an efficient and effective manner. For example, at least some examples described herein enable a communication device to be selectively configured between a single network configuration and a multiple network configuration. When operating in the single network configuration, the communication device may control or restrict a creation of multiple network connections to facilitate controlling power and/or data consumption at the communication device and/or communications (e.g., data flow) between the communication device and the network. Moreover, the examples described herein enable a communication device to seamlessly switch between using a first access point name to couple the communication device to a network and using a second access point name to couple the communication device to the network or another network. The examples described herein may be implemented using computer programming or engineering techniques including computing software, firmware, hardware, or a combination or subset thereof. Aspects of the disclosure enable controlling or restricting packet data access for managing network resources.

The examples described herein manage one or more operations or computations associated with communicating with a network. By managing broadband communication in the manner described in this disclosure, some examples reduce processing load, power consumption, data consumption, and/or network bandwidth usage by systematically coupling a communication device to, and decoupling the communication device from, one or more networks. For example, by detaching from a first network before attaching to a second network, the communication device is configurable to communicate via one network connection at a time. That is, the communication device may be configured to not communicate via the first network connection while the second network connection is active and/or not communicate via the second network connection while the first network connection is active. Accordingly, the examples described herein enable communication devices, networks, and/or network connections to be efficiently utilized so that at least some network resources may be effectively managed. Additionally, some examples may improve device or operating system resource allocation and/or improve communication between computing devices by streamlining at least some operations, improve user efficiency and/or user interaction performance via user interface interaction, and/or reduce error rate by automating at least some operations.

FIG. 1 is a block diagram of an example system 100 including one or more broadband wireless networks 110 and one or more wireless communication devices 120 (e.g., user equipment, terminal equipment, mobile station) configured to communicate with the wireless network 110. For example, the communication device 120 may couple or attach to the wireless network 110 such that data may be exchanged between the communication device 120 and the wireless network 110. In some examples, the communication device 120 includes an interface component 122 configured to receive (e.g., from a user of the communication device 120) or identify a request to couple the communication device 120 to the wireless network 110, and a connection component 124 configured to communicate with the interface component 122. The connection component 124 is configured to couple the communication device 120 to the wireless network 110 and/or decouple the communication device 120 from the wireless network 110. In some examples, the connection component 124 determines whether the communication device 120 is coupled to the wireless network 110 and/or identifies one or more network connections between the communication device 120 and the wireless network 110. For example, the connection component 124 may receive or identify an identifier (e.g., an Internet protocol (IP) address) assigned to or associated with the communication device 120. The communication device 120 may be or include, for example, a mobile device, a mobile telephone, a smartphone, a pager, a personal digital assistant, a tablet, a portable media player, a netbook, a laptop, a desktop computer, a personal computer, or any other computing device that may be used for wireless communication.

When coupled to the communication device 120, the wireless network 110 is configured to provide one or more services to the communication device 120. In some examples, the wireless network 110 includes a network core 130 configured to provide one or more services to the communication device 120 and/or manage one or more services provided to the communication device 120, and an air interface network 140 (e.g., a radio access network (RAN)) configured to facilitate communication between the communication device 120 and the network core 130. For example, the air interface network 140 may transmit radio transmissions to the communication device 120 (e.g., a downlink communication) and/or receive radio transmissions from the communication device 120 (e.g., an uplink communication). The air interface network 140 may be or include, for example, a Global System for Mobile Communications (GSM) RAN (GRAN), a GSM/Enhanced Data Rates for GSM Evolution (EDGE) RAN (GERAN), a Universal Mobile Telecommunications System (UMTS) Terrestrial RAN (UTRAN), an evolved UTRAN (E-UTRAN), or any other access network configured to couple a communication device 120 to a network core 130.

The network core 130 is configured to manage one or more operations for the wireless network 110. For example, the network core 130 may communicate with one or more packet data networks (PDNs) 150 (e.g., an IP network) to retrieve packet data and/or provide packet data to the communication device 120 (e.g., via the air interface network 140) to control an operation of the communication device 120 and/or provide a service to the communication device 120. The PDN 150 may be or include, for example, a personal area network (PAN), a local area network (LAN), a wide area network (WAN), a cellular or mobile network, the Internet, or any other network that uses, provides, or supports packet data communication. The PDN 150 may be identified by an access point name (APN) 160 that corresponds to the PDN 150. For example, the connection component 124 may receive an APN 160, and use the APN 160 to identify a PDN 150 corresponding to the APN 160 and transmit, to the PDN 150, an instruction to couple the communication device 120 to the wireless network 110. In response to the instruction, the PDN 150 may generate data based on the instruction (e.g., an indication associated with a status of the instruction), and the connection component 124 may receive or retrieve, from the PDN 150, the data. In some examples, the connection component 124 is selectively configurable between a single PDN configuration and a multiple PDN configuration. When the connection component 124 is selectively configured to be in a single PDN configuration, the communication device 120 may be coupled to zero PDNs 150 or one PDN 150. On the other hand, when the connection component 124 is selectively configured to be in the multiple PDN configuration, the communication device 120 may be coupled to any number of PDNs 150 including zero. In some examples, the APN 160 may be used to identify one or more services provided by or associated with the PDN 150.

Figure 2:
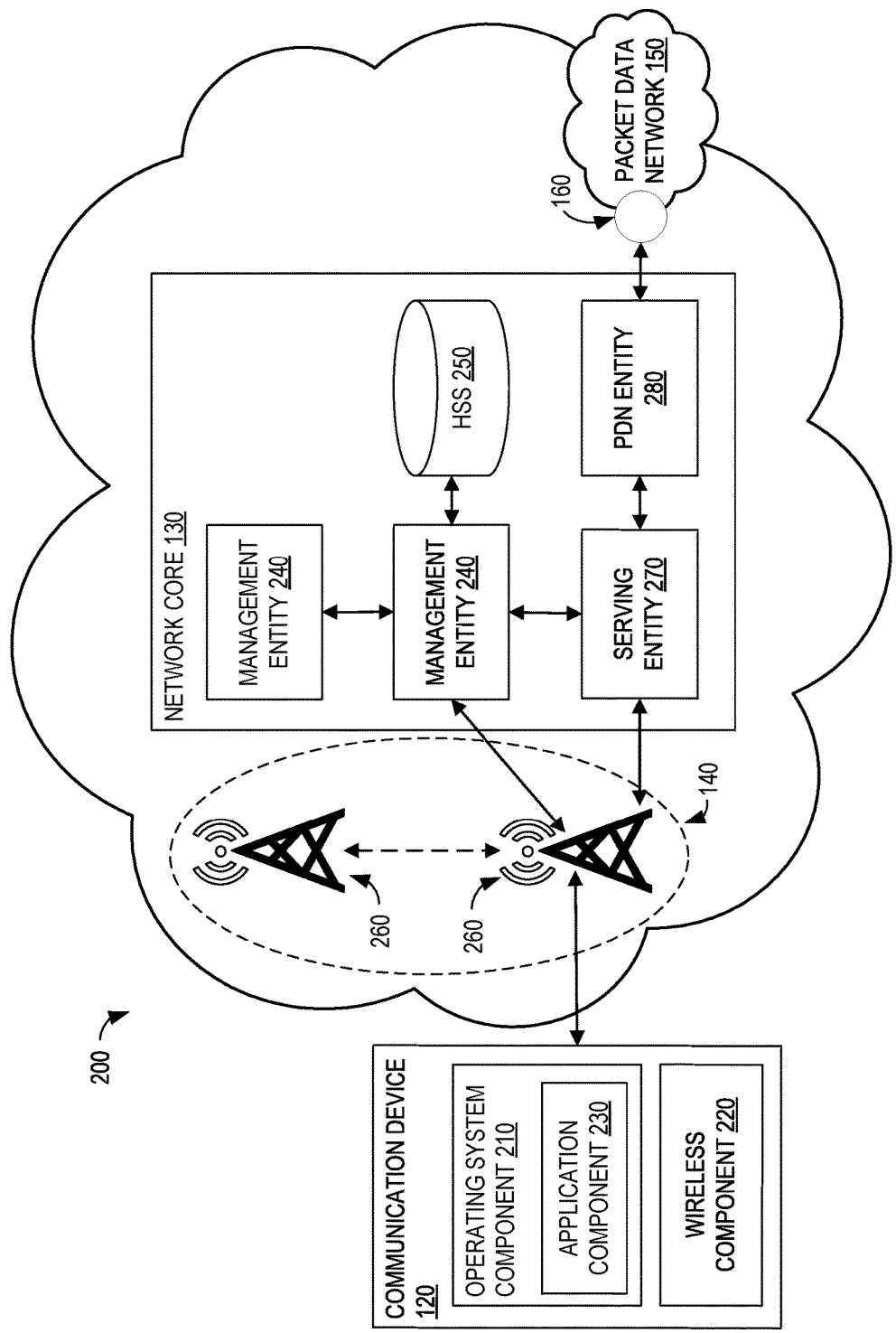
FIG. 2 is a block diagram of an example wireless network architecture for a communication system, such as the system shown in FIG. 1.

FIG. 2 is a block diagram of an example wireless network architecture 200 for a communication system (e.g., system 100) including one or more wireless communication devices 120, a network core 130, and an air interface network 140 configured to couple the communication device 120 to the network core 130. In some examples, the communication device 120 includes an operating system component 210 configured to manage one or more device resources. Device resources may include, for example, a memory component (e.g., a memory device) configured to store computer-executable instructions, a processor component (e.g., a processor) configured to execute the computer-executable instructions, and a wireless component 220 (e.g., a modem) configured to communicate with one or more broadband wireless networks 110 to facilitate coupling the communication device 120 to the wireless network 110. For example, the wireless component 220 may communicate with the network core 130 (e.g., via the air interface network 140) to identify a PDN 150 and couple the wireless component 220 to the wireless network 110 at the PDN 150. When the communication device 120 is coupled to the wireless network 110, the wireless network 110 may provide one or more services (e.g., wireless access) to the communication device 120. In some examples, the wireless component 220 is embedded on or directly coupled to a motherboard of the communication device 120. Alternatively, the wireless component 220 may be coupled to the motherboard using any other interface, such as a parallel port, a game port or a universal serial bus (USB).

In some examples, the operating system component 210 includes one or more application components 230 configured to access or use one or more device resources to perform one or more operations. When performing the one or more operations, the application component 230 may generate a call (e.g., a request) for the wireless component 220 to couple the communication device 120 to the wireless network 110. In some examples, the application component 230 includes or is associated with an interface component 122 (shown in FIG. 1) configured to receive (e.g., from a user of the communication device 120) a request to couple the communication device 120 to the wireless network 110. The request may include an APN 160 or identify the APN 160 for the wireless component 220. In some examples, the wireless component 220 includes or is associated with a connection component 124 (shown in FIG. 1) configured to receive or retrieve the request from the interface component 122 and, based on the request, use an APN 160 associated with the request to identify a PDN 150 corresponding to the APN 160, couple the communication device 120 to the wireless network 110, and/or decouple the communication device 120 from the wireless network 110. The PDN 150 may provide information associated with a packet data network connection between the communication device 120 and the wireless network 110 (e.g., an IP address) to the wireless component 220 (e.g., via the network core 130 and/or the air interface network 140). In some examples, the wireless component 220 communicates with the operating system component 210 to enable packet data to be transmitted between the application component 230 and the wireless network 110 using a radio access technology, such as Long-Term Evolution (LTE), Wideband Code Division Multiplexing Access (WCDMA), General Packet Radio Service (GPRS), Evolution-Data Optimized (EVDO), or any other technology configured to couple a wireless network 110 to a communication device 120.

The network core 130 includes one or more core nodes or management entities 240 (e.g., a mobility management entity (MME)) configured to manage one or more operations for the network architecture 200. For example, the management entity 240 may communicate with one or more PDNs 150 to retrieve packet data (e.g., a handover command) and provide the packet data to the communication device 120 (e.g., via the air interface network 140) to control an operation of the communication device 120 and/or provide a service to the communication device 120. In some examples, the management entity 240 communicates with a Home Subscriber Server (HSS) 250 configured to store and manage a database including user subscription information to retrieve an APN 160 associated with a communication device 120 or a user of the communication device 120 (e.g., a default APN 160), and identify a PDN 150 corresponding to the APN 160 to facilitate communication between the communication device 120 and the wireless network 110. The HSS 250 may include, for example, a plurality of APNs 160 associated with a plurality of communication devices 120 or a plurality of users of the communication devices 120.

The air interface network 140 includes one or more interface nodes or base stations 260 (e.g., a Node B, an evolved Node B (eNB)) configured to transmit radio transmissions to the communication device 120 and/or receive radio transmissions from the communication device 120 to enable the communication device 120 to communicate with the wireless network 110. Additionally or alternatively, the base station 260 may be configured to transmit radio transmission to another device in the wireless network 110 (e.g., management entity 240, base station 260) and/or receive radio transmissions from another device in the wireless network 110 to enable the wireless network 110 to communicate with the communication device 120. For example, the base station 260 may transmit signaling messages (e.g., a handover command) received from the management entity 240 to the communication device 120 for managing an operation of the communication device 120 and/or providing a service to the communication device 120.

In some examples, the management entity 240 communicates with other devices in the wireless network 110 (e.g., another management entity 240, HSS 250, base station 260) and manages one or more operations for the wireless network 110. For example, the management entity 240 may perform one or more functions to manage access-to-network connections, assign network resources, and/or handle mobility states to support one or more operations, such as location tracking, paging, roaming, handovers, and the like. In some examples, the network core 130 includes a serving node or serving entity 270 (e.g., a serving gateway, a serving support node) configured to couple a management entity 240 to a base station 260, and a gateway node or gateway entity 280 (e.g., a PDN gateway, a gateway support node) configured to couple the management entity 240 to a PDN 150.

Figure 3:
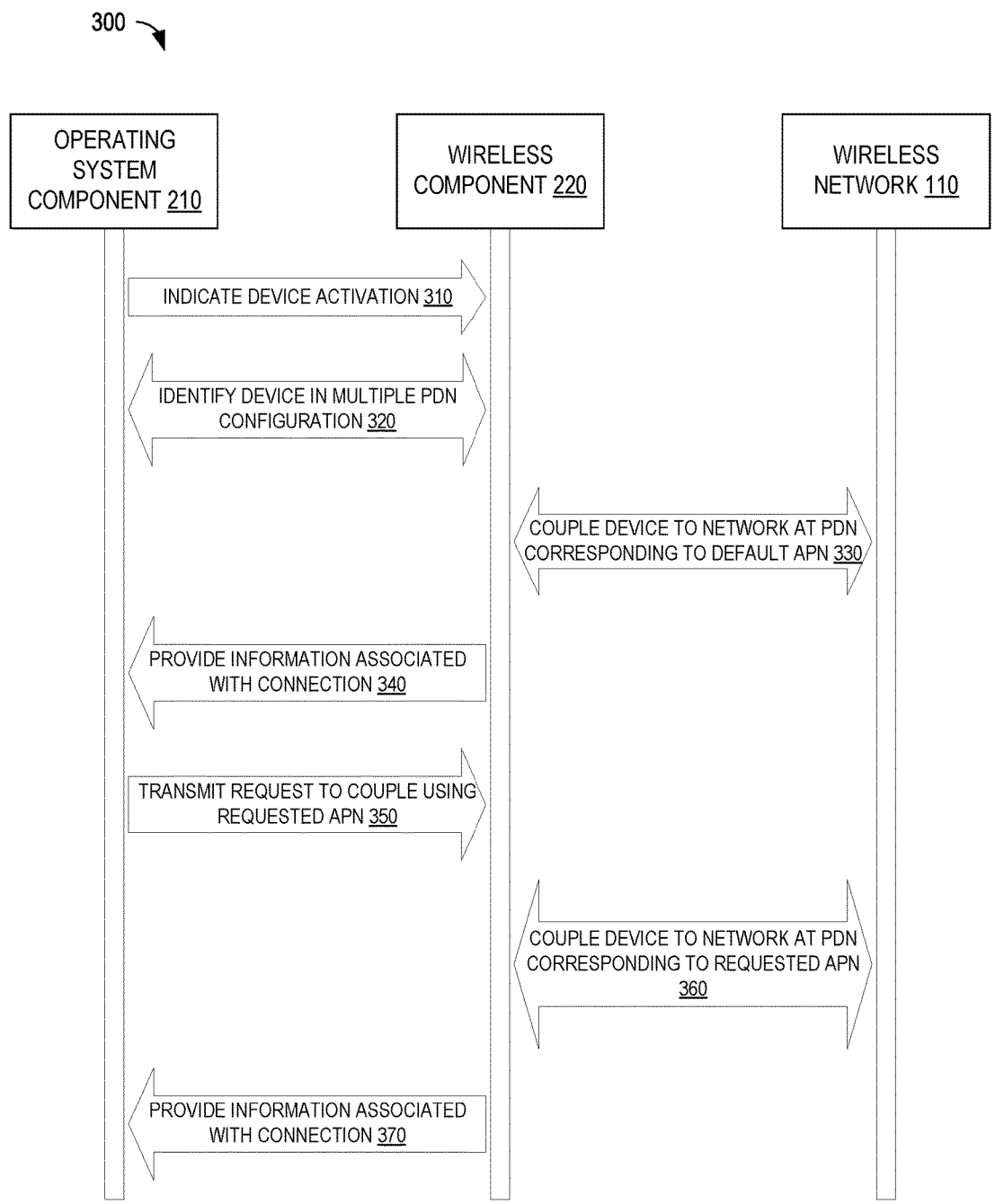
FIG. 3 is a call flow diagram for coupling a wireless communication device to a wireless network using a multiple packet data network configuration.

FIG. 3 is a call flow diagram 300 for using one or more APNs 160 to couple a wireless communication device 120 to a wireless network 110. Upon activating (e.g., powering on, waking) the communication device 120, an operating system component 210 communicates with a wireless component 220 to indicate at 310 that the communication device 120 is activated. For example, the operating system component 210 may transmit a signal or indication to the wireless component 220.

The operating system component 210 and the wireless component 220 communicate to identify at 320 that the communication device 120 is in a multiple PDN configuration. In some examples, the communication device 120 is selectively configurable between the multiple PDN configuration and a single PDN configuration. For example, the connection component 124 may selectively configure the communication device 120 to allow the communication device 120 to seamlessly switch between the multiple PDN configuration and the single PDN configuration. In the multiple PDN configuration, the communication device 120 is coupleable or attachable to the wireless network 110 at zero or more PDNs 150. That is, in the multiple PDN configuration, the communication device 120 may use one or more APNs 160 to couple or attach to the wireless network 110. In the single PDN configuration, the communication device 120 is coupleable or attachable to the wireless network 110 at zero PDNs or one PDN 150. In this manner, in the single PDN configuration, the communication device 120 may not use a plurality of APNs 160 to couple or attach to the wireless network 110 at a plurality of PDNs 150 at the same time.

The wireless component 220 communicates with one or more broadband wireless networks 110 to couple or attach at 330 the communication device 120 to the wireless network 110 at a first PDN 150 corresponding to a first APN 160 (e.g., a default APN 160). For example, a management entity 240 may communicate with an HSS 250 to retrieve the first APN 160 and identify the first PDN 150 corresponding to the first APN 160 such that the communication device 120 may be coupled or attached to the wireless network 110 at the first PDN 150. Alternatively, a first APN 160 may be selected or identified at the communication device 120. The wireless component 220 communicates with the operating system component 210 to provide at 340 information associated with the network connection between the communication device 120 and the wireless network 110 (e.g., an IP address) to the operating system component 210.

When the communication device 120 is coupled or attached to the wireless network 110, data may be exchanged between the communication device 120 and the wireless network 110. In some examples, the operating system component 210 communicates with the wireless component 220 to transmit an instruction associated with coupling the communication device 120 to the wireless network 110 using a second APN 160 (e.g., a requested APN 160). For example, the application component 230 may indicate a desire to use or be provided with at least one service (e.g., a requested service) by generating a call for the operating system component 210 to transmit at 350, to the wireless component 220, a request to couple or attach the communication device 120 to the wireless network 110 using the second APN 160.

If the second APN 160 is different from the first APN 160, the wireless component 220 may communicate with the wireless network 110 to couple or attach at 360 the communication device 120 to the wireless network 110 at a second PDN 150 corresponding to the second APN 160. For example, a management entity 240 may receive the second APN 160, and identify the second PDN 150 based on the second APN 160 such that the communication device 120 is coupleable or attachable to the wireless network 110 at the second PDN 150. On the other hand, if the second APN 160 is the same as the first APN 160 (or any other APN 160 being used to couple or attach the communication device 120 to the wireless network 110), the wireless network 110 may provide the requested service to the communication device 120 using an active network connection between the communication device 120 and the wireless network 110 (e.g., at the first PDN 150). The wireless component 220 communicates with the operating system component 210 to provide at 370 information associated with the network connection between the communication device 120 and the wireless network 110 (e.g., an IP address) to the operating system component 210.

Figure 4:
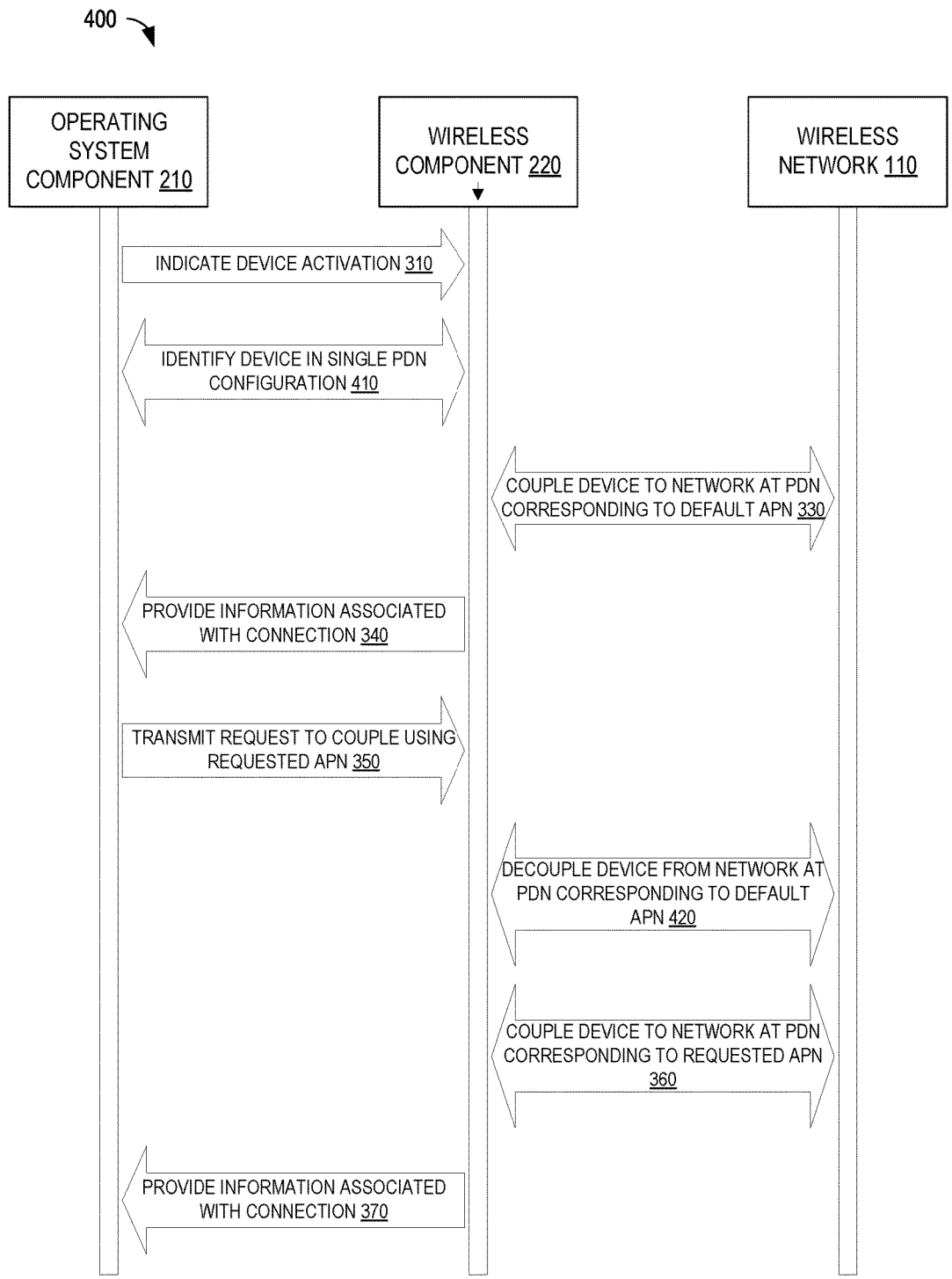
FIG. 4 is a call flow diagram for coupling a wireless communication device to a wireless network using a single packet data network configuration.

FIG. 4 is a call flow diagram 400 for using a single APN 160 to couple a wireless communication device 120 to a wireless network 110 when the communication device 120 is in a single PDN configuration. The call flow diagram 400 includes operations that are the same as or similar to the operations shown in the call flow diagram 300. For example, the operating system component 210 may communicate with the wireless component 220 to indicate at 310 that the communication device 120 is activated. As shown in FIG. 4, the operating system component 210 and the wireless component 220 communicate to identify at 410 that the communication device 120 is in the single PDN configuration. The wireless component 220 communicates with one or more broadband wireless networks 110 to couple or attach at 330 the communication device 120 to the wireless network 110 at a first PDN 150 corresponding to a first APN 160 (e.g., a default APN 160), and the wireless component 220 communicates with the operating system component 210 to provide at 340 information associated with the network connection between the communication device 120 and the wireless network 110 (e.g., an IP address) to the operating system component 210.

The operating system component 210 communicates with the wireless component 220 to transmit an instruction associated with coupling the communication device 120 to the wireless network 110 using a second APN 160 (e.g., a requested APN 160). For example, the application component 230 may indicate a desire to use or be provided with at least one service (e.g., a requested service) by generating a call for the operating system component 210 to transmit at 350, to the wireless component 220, a request to couple or attach the communication device 120 to the wireless network 110 using the second APN 160.

If the second APN 160 is different from the first APN 160, the wireless component 220 may communicate with the wireless network 110 to decouple or detach at 420 the communication device 120 from the wireless network 110 (e.g., at the first PDN 150), and communicate with the wireless network 110 to couple or attach at 360 the communication device 120 to the wireless network 110 at a second PDN 150 corresponding to the second APN 160. In the single PDN configuration, the communication device 120 may control or restrict a creation of multiple network connections to facilitate controlling power and/or data consumption at the communication device 120 and/or communications (e.g., data flow) between the communication device 120 and the wireless network 110. For example, the communication device 120 is restricted from simultaneously or concurrently using a plurality of APNs 160 to couple or attach the communication device 120 to the wireless network 110 (e.g., at a plurality of PDNs 150).

In the single PDN configuration, the communication device 120 may identify an active PDN 150 (e.g., a PDN 150 associated with an active network connection) and/or an active APN 160 (e.g., an APN 160 associated with an active network connection), and manage the active PDN 150 and/or the active APN 160 such that the communication device 120 is coupled or attached to the wireless network 110 at, at most, a single PDN 150 (e.g., the active PDN 150). For example, upon using an APN 160 to couple or attach the communication device 120 to the wireless network 110, the APN 160 may be identified as the active APN 160. In some examples, the APN 160 is identified as the active APN 160 upon receiving, from a corresponding PDN 150, an indication associated with a status of the attachment (e.g., an acknowledgement of a successful attachment) and/or a status of the instruction to couple or attach the communication device 120 to the wireless network 110 at the PDN 150 (e.g., an acknowledgement of a satisfied instruction). Upon identifying a request to couple or attach the wireless component 220 to the wireless network 110 using an APN 160 other than the active APN 160, the communication device 120 decouples or detaches the active PDN 150), or using, at most, a single APN 160 (e.g., the active APN 160). For example, when coupled or attached to the wireless network 110 using an active APN 160 (e.g., a first APN), a communication device 120 may decouple or detach from the wireless network 110 (e.g., at the first APN 160) upon receiving or identifying a request (e.g., from an operating system component 210 and/or a user of the communication device 120) to use a second APN 160 to couple or attach to the wireless network 110 or before the second APN 160 is used to couple or attach to the wireless network 110. That is, upon decoupling or detaching from the wireless network 110, the first APN 160 is no longer identified as the active APN 160 or is identified as an inactive APN 160 and, upon using the second APN 160 to couple or attach the communication device 120 to the wireless network 110, the second APN 160 is identified as the active APN 160. The wireless component 220 communicates with the operating system component 210 to provide at 370 information associated with the network connection between the communication device 120 and the wireless network 110 (e.g., an IP address) to the operating system component 210.

Figure 5:
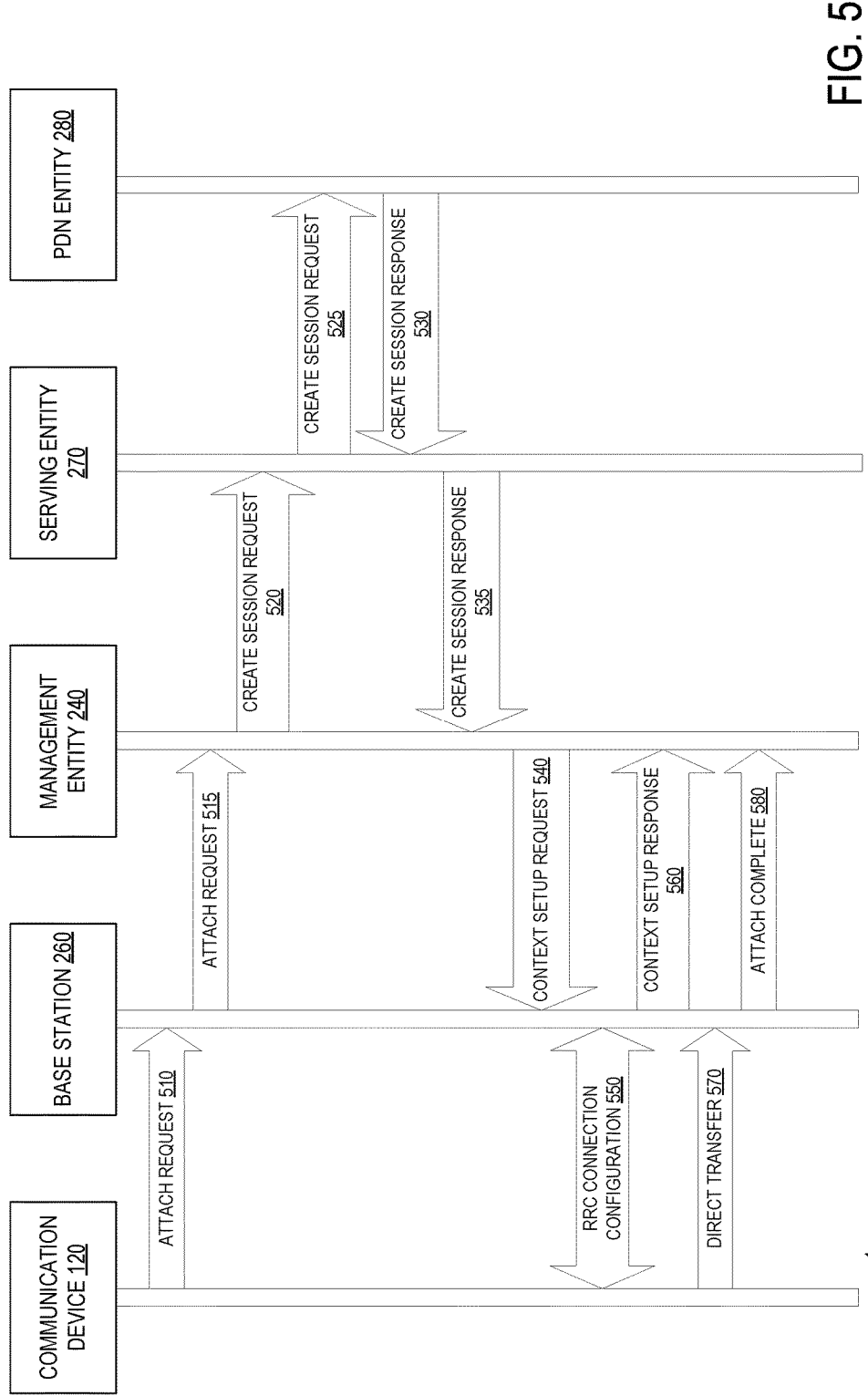
FIG. 5 is a detailed call flow diagram for coupling a wireless communication device to a wireless network.

FIG. 5 is a detailed call flow diagram 500 for coupling a wireless communication device 120 to a wireless network 110. In some examples, the communication device 120 initiates an attachment operation by generating an attach request message, and transmits at 510 the attach request message to a base station 260. The attach request message may be associated with one or more parameters (e.g., Radio Resource Control (RRC) parameters). The base station 260 may uniquely identify the communication device 120 (e.g., based on a unique identifier), and select or identify a management entity 240 to which the attach request message may be forwarded. For example, the management entity 240 may be identified based on the parameters. The base station 260 forwards the attach request message to the management entity 240 by transmitting at 515 the attach request message to the management entity 240.

Based on the attach request message, the management entity 240 generates a create session request message, identifies or selects a serving entity 270, and transmits at 520 the create session request message to the serving entity 270. In some examples, the management entity 240 communicates with the HSS 250 to store data associated with the communication device 120 and/or a user of the communication device 120. Additionally or alternatively, the management entity 240 may communicate with the HSS 250 to receive or retrieve data associated with a PDN 150 that is associated with the create session request message (e.g., a desired target of the create session request message). The serving entity 270 forwards the create session request message to a gateway entity 280 by transmitting at 525 the create session request message to the gateway entity 280, which communicates with the PDN 150. Based on the create session request message, the PDN 150 generates a create session response message, and the gateway entity 280 receives or retrieves the create session response message. The gateway entity 280 transmits at 530 the create session response message to the serving entity 270, which forwards the create session response message to the management entity 240 by transmitting at 535 the create session response message to the management entity 240.

Based on the create session response message, the management entity 240 generates a context setup request message, and transmits at 540 the context setup request message to the base station 260. The context setup request message is associated with establishing a context between the management entity 240 and the base station 260. In some examples, the context setup request message may be associated with an approval of a network connection between the communication device 120 and the wireless network 110 (e.g., attach accept message), which may be transmitted to the communication device 120.

The base station 260 communicates at 550 with the communication device 120 to configure an RRC connection between the base station 260 and the communication device 120. The RRC connection configures a user plane and/or a control plane according to a network status and enables signaling messages to be transmitted between the communication device 120 and the base station 260. In some examples, the base station 260 transmits the attach accept message, information associated with the network connection between the communication device 120 and the wireless network 110 (e.g., an IP address), and/or an active APN 160 to the communication device 120. The base station 260 transmits at 560 a context setup response message to the management entity 240. The context setup enables a context between the base station 260 and the management entity 240 to be established. The communication device 120 transmits at 570 a direct transfer message to the base station 260. The direct transfer message may include an attach complete message, which the base station 260 may transmit at 580 to the management entity 240.

Figure 6:
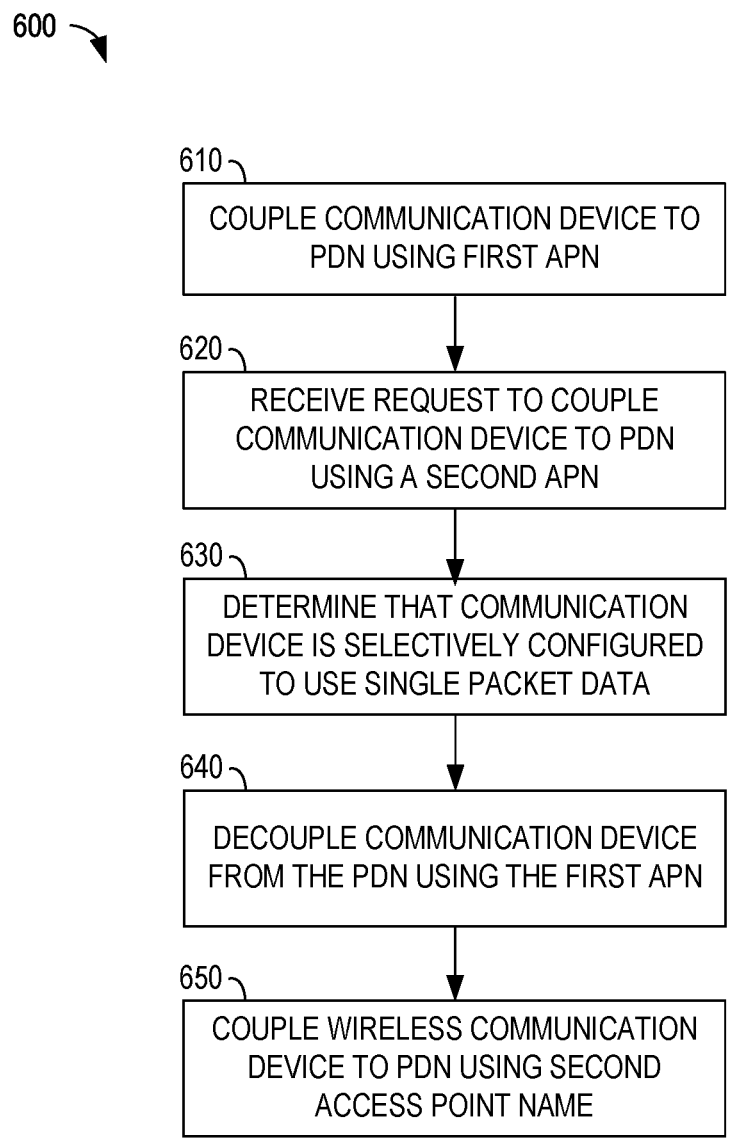
FIG. 6 is a flowchart of an example method for coupling a wireless communication device to a wireless network in an environment, such as the system shown in FIG. 1.

FIG. 6 is a flowchart of an example method 600 for coupling a wireless communication device 120 to a wireless network 110. In some examples, the communication device 120 uses a first APN 160 (e.g., a default APN 160) to couple or attach at 610 to the wireless network 110. When the communication device 120 is coupled or attached to the wireless network 110, a request to couple or attach the communication device 120 to the wireless network 110 using a second APN 160 may be received at 620. For example, the communication device 120 may receive at 620 the request at the application component 230 and/or from a user of the communication device 120. In some examples, the second APN 160 is different from the first APN 160.

In some examples, it is determined at 630 that the communication device 120 is selectively configured to use a single PDN 150 for data transfers. The communication device 120 decouples or detaches at 640 from the wireless network 110 (e.g., at a first PDN 150 associated with the first APN 160), and couples or attaches 650 to the wireless network 110 at a second PDN 150 associated with the second APN 160.

Figure 7:
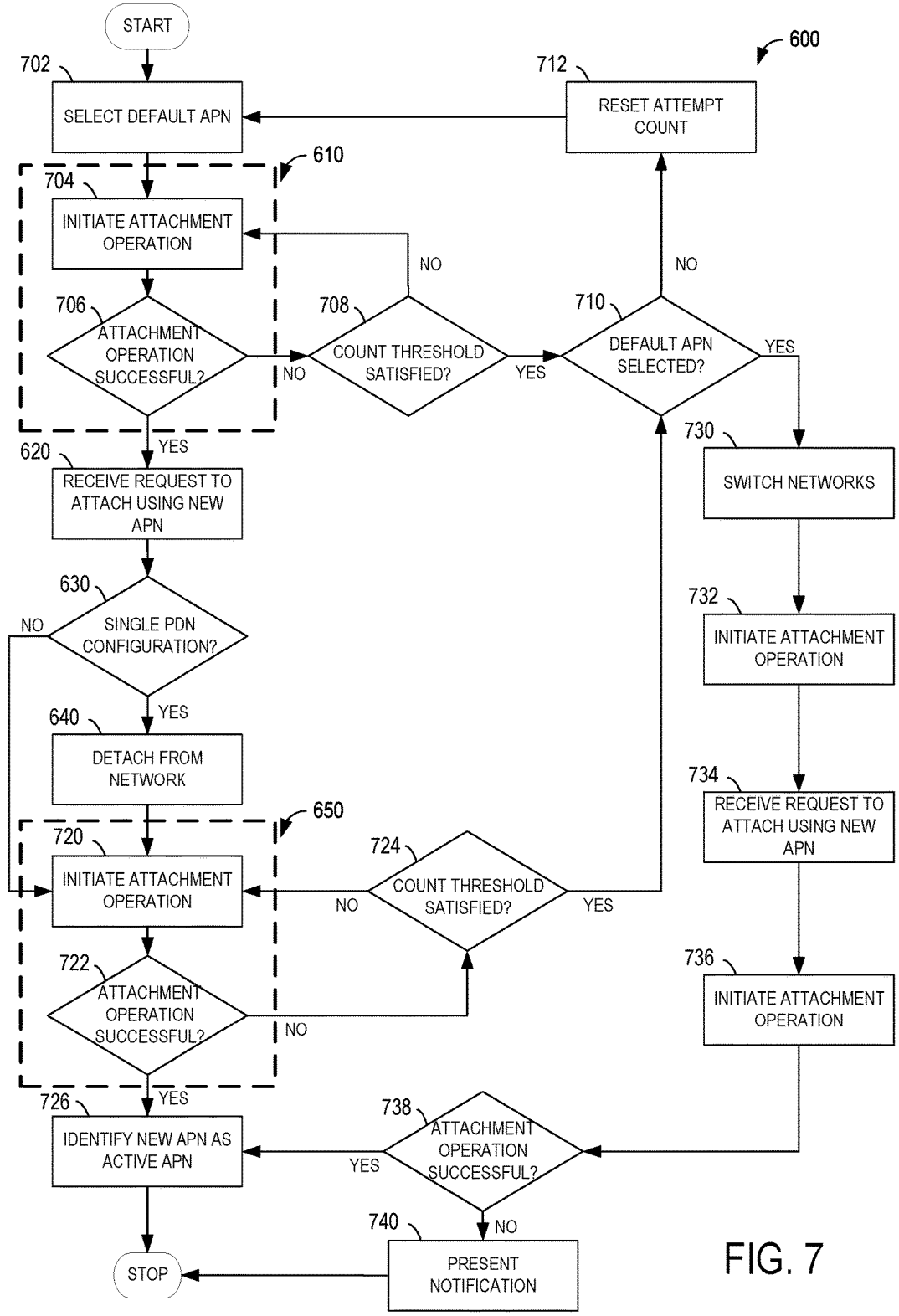
FIG. 7 is a detailed flowchart of the method shown in FIG. 6.

FIG. 7 is a detailed flowchart of the method 600 for coupling a wireless communication device 120 to a wireless network 110. In some examples, a first APN 160 (e.g., a default APN 160) is identified or selected at 702. For example, the communication device 120 may retrieve or receive the first APN 160 from an HSS 250 (e.g., via the management entity 240 and/or the base station 260) and identify or select the first APN 160 at 702. Alternatively, the first APN 160 may be identified or selected by an application component 230 or provided or selected by a user of the communication device 120.

At 610, the first APN 160 is used to attach the communication device 120 to the wireless network 110. The attachment operation may include, for example, initiating the attachment operation at 704 and determining whether the attachment operation is successful at 706. The attachment operation is initiated at 704 by using the first APN 160 (e.g., the requested APN 160) to generate an instruction associated with attaching the communication device 120 to the wireless network 110 (e.g., attach request message), and transmitting the instruction to the wireless network 110.

A management entity 240 may receive the instruction (e.g., via a base station 260). Based on the instruction, the management entity 240 may identify a first PDN 150 corresponding to the first APN 160, and communicate with the first PDN 150 to attach the communication device 120 to the wireless network 110. In response to receiving or processing the instruction, the first PDN 150 may generate data (e.g., an indication) based on the instruction.

The indication generated by the first PDN 150 is assessed or analyzed to determine at 706 whether the attachment operation is successful. For example, the indication may be associated with a status of the instruction. An indication associated with a satisfied status (e.g., the instruction has been satisfied) is indicative of a successful network connection between the communication device 120 and the wireless network 110. On the other hand, an indication associated with a status other than the satisfied status (e.g., the instruction may not have been satisfied) may be indicative of an unsuccessful network connection between the communication device 120 and the wireless network 110. If it is determined at 706 that the attachment operation is unsuccessful, the attachment operation may be iteratively repeated in at least some cases. For example, upon determining at 706 that the attachment operation is unsuccessful, the communication device 120 may determine at 708 whether an attempt count (e.g., a quantity of attempts) associated with the attachment operation satisfies a predetermined count threshold. If the count threshold is not satisfied at 708 (e.g., the quantity of attempts determined is less than the predetermined count threshold), the attempt count may be increased (e.g., by one), and the attachment operation may be repeated at 610. For example, the communication device 120 may initiate at 704 the attachment operation, and determine at 706 whether the attachment operation is successful.

If, on the other hand, the count threshold is satisfied at 708 (e.g., the quantity of attempts determined is equal to or greater than the predetermined count threshold), it may be determined at 710 whether a default APN 160 was selected to perform the attachment operation. For example, the communication device 120 may retrieve or receive the default APN 160 from the HSS 250 (e.g., via the management entity 240 and/or the base station 260), and compare the default APN 160 with the first APN 160 (e.g., the APN 160 selected to perform the attachment operation) to determine at 710 whether the default APN 160 is, or is at least associated with, the first APN 160 selected to perform the attachment operation.

If it is determined at 710 that the default APN 160 was selected, the communication device 120 may switch wireless networks 110 at 730. On the other hand, if it is determined at 710 that the default APN 160 was not selected, another first APN 160 (e.g., the default APN 160) may be identified or selected at 702 and the attachment operation may be repeated at 610 using the other first APN 160. In some examples, the attempt count is reset at 712. When reset at 712, the attempt count may be decreased to or by any quantity including, for example, to a predetermined quantity (e.g., the attempt count is decreased to a predetermined value), to a desired quantity (e.g., the attempt count is decreased to a user-provided or application component-provided value), by a predetermined quantity (e.g., the attempt count is decreased by a predetermined value), and by a desired quantity (e.g., the attempt count is decreased by a user-provided or application component-provided value).

For a successful attachment operation, the first APN 160 and the corresponding PDN 150 (e.g., the first PDN 150) may be identified as being an active APN 160 and an active PDN 150, respectively. When the first APN 160 and the first PDN 150 are active, the communication device 120 is attached to the wireless network 110 at the first PDN 150 such that data may be exchanged between the communication device 120 and the wireless network 110.

When the communication device 120 is attached to the wireless network 110 (e.g., at the first PDN 150), a request to attach the communication device 120 to the wireless network 110 using a second APN 160 may be received at 620. For example, the communication device 120 may receive at 620 the request at the application component 230 and/or from a user of the communication device 120. In some examples, it is determined at 630 whether the communication device 120 is in a single PDN configuration.

If it is determined at 630 that the communication device 120 is a configuration other than the single PDN configuration (e.g., the communication device 120 is in the multiple PDN configuration), the communication device 120 is attachable to the wireless network 110 at 650 using the second APN 160, in addition to using other APNs 160 to attach the communication device 120 to the wireless network 110. That is, when the communication device 120 is in the multiple PDN configuration, using the second APN 160 to attach the communication device 120 to the wireless network 110 at 650 does not replace or supplant another APN 160 being used to attach the communication device 120 to the wireless network 110 (e.g., an active APN 160).

If it is determined at 630 that the communication device 120 is in the single PDN configuration, the communication device 120 is attachable to the wireless network 110 at 650 using, at most, one APN 160 (e.g., the second APN 160). That is, when the communication device 120 is in the single PDN configuration, an instruction to use the second APN 160 to attach the communication device 120 to the wireless network 110 is managed or processed such that there is only one active APN 160 at a given moment in time. For example, the instruction may be declined such that the second APN 160 is not used to attach the communication device 120 to the wireless network 110, or the instruction may be accepted such that the second APN 160 is used to replace or supplant an active APN 160 (e.g., the active APN 160 becomes inactive) and attach the communication device 120 to the wireless network 110.

In some examples, a first instruction associated with detaching the communication device 120 from the wireless network 110 (e.g., detach request message) is generated and transmitted to the wireless network 110. A management entity 240 may receive the first instruction (e.g., via a base station 260) and, based on the first instruction, identify the first PDN 150 and communicate with the first PDN 150 to detach the communication device 120 from the wireless network 110 (e.g., at the first PDN 150). In response to receiving or processing the first instruction, the first PDN 150 may generate data (e.g., an indication) based on the first instruction.

The indication generated by the first PDN 150 is assessed or analyzed to determine whether the detachment operation is successful. For example, the indication may be associated with a status of the first instruction. An indication associated with a satisfied status (e.g., the first instruction has been satisfied) is indicative of a successful detachment. On the other hand, an indication associated with a status other than the satisfied status (e.g., the first instruction may not have been satisfied) may be indicative of an unsuccessful detachment.

Upon detaching from the wireless network at 640, the second APN 160 is used to attach the communication device 120 to the wireless network 110 at 650. The attachment operation at 650 includes operations (or sub-operations) that are the same or similar to the operations (or sub-operations) of the attachment operation at 610. For example, the attachment operation at 650 may include initiating the attachment operation at 720 and determining whether the attachment operation is successful at 722. In some examples, the attachment initiation operation at 720 is the same or similar to the attachment initiation operation at 704 and/or the determination operation at 722 is the same or similar to the determination operation at 706. For example, the communication device 120 may initiate the attachment operation at 720 by using the second APN 160 (e.g., a requested APN 160) to generate a second instruction associated with attaching the communication device 120 to the wireless network 110 (e.g., attach request message), and transmitting the second instruction to the wireless network 110.

A management entity 240 may receive the second instruction (e.g., via a base station 260). Based on the second instruction, the management entity 240 may identify a second PDN 150 corresponding to the second APN 160, and communicate with the second PDN 150 to attach the communication device 120 to the wireless network 110. In response to receiving or processing the second instruction, the second PDN 150 may generate data (e.g., an indication) based on the second instruction.

The indication generated by the second PDN 150 is assessed or analyzed to determine at 722 whether the attachment operation is successful. If it is determined at 722 that the attachment operation is successful, the second APN 160 and the corresponding PDN 150 (e.g., the second PDN 150) may be identified at 726 as being an active APN 160 and an active PDN 150, respectively. For example, when the communication device 120 is in the single PDN configuration, the second APN 160 is identified at 726 as the only active APN 160, and the second PDN 150 is identified as the only active PDN 150. On the other hand, if the communication device 120 is in the multiple PDN configuration, the second APN 160 is identified at 726 as an additional active APN 160, and the second PDN 150 is identified as an additional active PDN 150. When the second APN 160 and the second PDN 150 are active, the communication device 120 is attached to the wireless network 110 at the second PDN 150 such that data may be exchanged between the communication device 120 and the wireless network 110.

An indication associated with a status other than the satisfied status (e.g., the second instruction may not have been satisfied) may be indicative of an unsuccessful network connection between the communication device 120 and the wireless network 110. If it is determined at 722 that the attachment operation is unsuccessful, the attachment operation may be iteratively repeated in at least some cases. For example, upon determining at 722 that the attachment operation is unsuccessful, the communication device 120 may determine at 724 whether an attempt count associated with the attachment operation satisfies a predetermined count threshold. The determination operation at 724 is the same or similar to the determination operation at 708. If the count threshold is not satisfied at 724 (e.g., the quantity of attempts determined is less than the predetermined count threshold), the attempt count may be increased (e.g., by one), and the attachment operation may be repeated at 650. In some examples, each APN 160 may be associated with a respective attempt count. Alternatively, a predetermined combination of APNs 160 may be associated with a common attempt count.

If, on the other hand, the count threshold is satisfied at 724 (e.g., the quantity of attempts determined is equal to or greater than the predetermined count threshold), it may be determined at 710 whether a default APN 160 was selected to perform the attachment operation. If it is determined at 710 that the default APN 160 was not selected, at least some operations of the method 600 may be repeated to attach the communication device 120 to the wireless network 110 or detach the communication device 120 from the wireless network 110.

On the other hand, if it is determined that the default APN 160 was selected, the communication device 120 may switch wireless networks 110 at 730 from the wireless network 110 (e.g., a first wireless network 110) to another wireless network 110 (e.g., a second wireless network 110). The second wireless network 110 may, for example, allow the communication device 120 to attach to the second wireless network 110 with or without an APN 160. An attachment operation is initiated at 732 for attaching the communication device 120 to the second wireless network 110. For a successful attachment operation, the communication device 120 is attached to the second wireless network 110 such that data may be exchanged between the communication device 120 and the second wireless network 110.

While the second wireless network 110 may allow a communication device 120 to attach to the second wireless network 110 without an APN 160, an APN 160 may be used to attach the communication device 120 to the second wireless network 110. For example, a request to attach the communication device 120 to the second wireless network 110 using an APN 160 may be received at 734. In some examples, the communication device 120 receives at 734 the request from an HSS 250 of the second wireless network 110, at the application component 230, and/or from a user of the communication device 120.

Based on the request to attach the communication device 120 to the second wireless network 110, the APN 160 is used to attach the communication device 120 to the second wireless network by initiating the attachment operation at 736 and determining whether the attachment operation is successful at 738. In some examples, the attachment initiation operation at 736 is the same or similar to the attachment initiation operations at 704 and 720 and/or the determination operation at 738 is the same or similar to the determination operations at 706 and 722. For example, the attachment operation is initiated at 736 by using the APN 160 (e.g., a requested APN 160) to generate an attach request message, and transmitting the instruction to the second wireless network 110.

A management entity 240 of the second wireless network 110 may receive the attach request message (e.g., via a base station 260 of the second wireless network 110) and, based on the attach request message, identify a PDN 150 of the second wireless network 110 that corresponds to the APN 160, and communicate with the PDN 150 to attach the communication device 120 to the second wireless network 110. In response to receiving or processing the attach request message, the PDN 150 may generate data (e.g., an indication) based on the instruction.

The indication generated by the PDN 150 of the second wireless network 110 is assessed or analyzed to determine at 738 whether the attachment operation is successful. If it is determined at 738 that the attachment operation is successful, the APN 160 and the corresponding PDN 150 (e.g., the PDN 150 of the second wireless network 110) may be identified at 726 as being an active APN 160 and an active PDN 150, respectively. When the APN 160 and the PDN 150 of the second wireless network 110 are active, the communication device 120 is attached to the second wireless network 110 at the PDN 150 of the second wireless network 110 such that data may be exchanged between the communication device 120 and the second wireless network 110. On the other hand, if it is determined at 738 that the attachment operation is unsuccessful, a notification indicating that the attachment operation is successful, a notification is generated and presented at 740 to a user of the communication device 120. In some examples, the attachment operation may be repeated in at least some cases.

Figure 8:
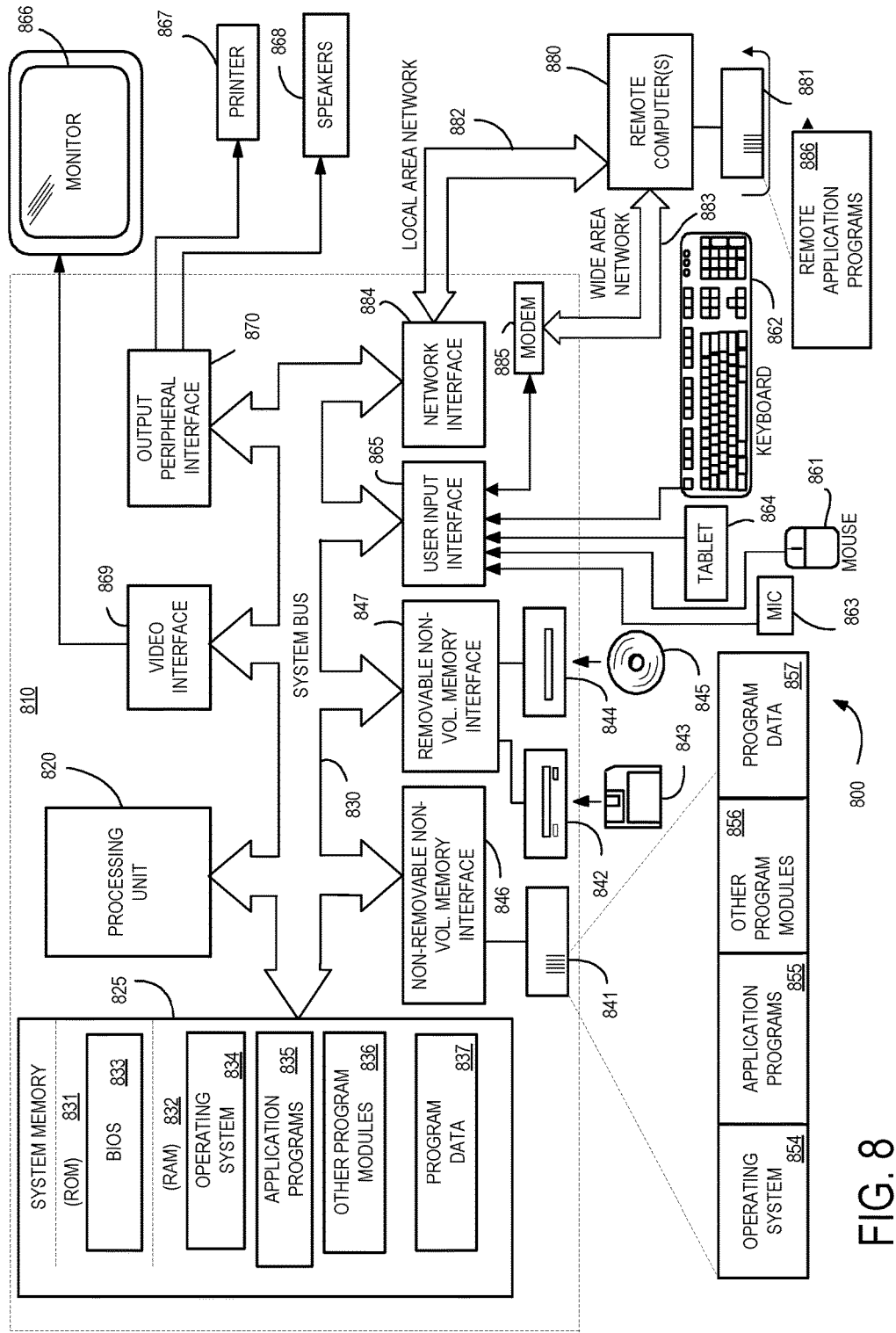
FIG. 8 is a block diagram of an example computing device that may be used in an environment, such as the system shown in FIG. 1.

FIG. 8 is a block diagram of an example computing device 800 that may be used to manage packet data access for one or more wireless communication devices 120 in an environment (e.g., system 100). The computing device 800 is only one example of a computing and networking environment and is not intended to suggest any limitation as to the scope of use or functionality of the disclosure. The computing device 800 should not be interpreted as having any dependency or requirement relating to any one or combination of components illustrated in the example computing device 800.

The disclosure is operational with numerous other computing and networking environments or configurations. While some examples of the disclosure are illustrated and described herein with reference to the computing device 800 being or including a wireless communication device 120 (shown in FIG. 1), aspects of the disclosure are operable with any computing system or device (e.g., wireless network 110, interface component 122, connection component 124, network core 130, air interface network 140, PDNs 150, wireless network architecture 200, operating system component 210, wireless component 220, application component 230, management entities 240, HSS 250, base station 260, serving entity 270, gateway entity 280) that executes instructions to implement the operations and functionality associated with the computing device 800.

For example, the computing device 800 may include a mobile device, a mobile telephone, a phablet, a tablet, a portable media player, a netbook, a laptop, a desktop computer, a personal computer, a server computer, a computing pad, a kiosk, a tabletop device, an industrial control device, multiprocessor systems, microprocessor-based systems, set top boxes, programmable consumer electronics, network computers, minicomputers, mainframe computers, distributed computing environments that include any of the above systems or devices, and the like. The computing device 800 may represent a group of processing units or other computing devices. Additionally, any computing device described herein may be configured to perform any operation described herein including one or more operations described herein as being performed by another computing device.

With reference to FIG. 8, an example system for implementing various aspects of the disclosure may include a general purpose computing device in the form of a computer 810. Components of the computer 810 may include, but are not limited to, a processing unit 820, a system memory 825 (e.g., a memory device), and a system bus 830 that couples various system components including the system memory 825 to the processing unit 820. The system bus 830 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 825 includes any quantity of media associated with or accessible by the processing unit 820. For example, the system memory 825 may include computer storage media in the form of volatile and/or nonvolatile memory such as read only memory (ROM) 831 and random access memory (RAM) 832. The ROM 831 may store a basic input/output system 833 (BIOS) that facilitates transferring information between elements within computer 810, such as during start-up. The RAM 832 may contain data and/or program modules that are immediately accessible to and/or presently being operated on by processing unit 820. For example, the system memory 825 may store computer-executable instructions, operating system component 210, application component 230, APN 160, user subscription information, communication device data, and other data.

The processing unit 820 may be programmed to execute the computer-executable instructions for implementing aspects of the disclosure, such as those illustrated in the figures (e.g., FIGS. 3-7). By way of example, and not limitation, FIG. 8 illustrates operating system 834 (e.g., operating system component 210), application programs 835 (e.g., application component 230), other program modules 836, and program data 837. The processing unit 820 includes any quantity of processing units, and the instructions may be performed by the processing unit 820 or by multiple processors within the computing device 800 or performed by a processor external to the computing device 800.

The system memory 825 may include an interface component 122 and/or a connection component 124. Upon programming or execution of these components, the computing device 800 and/or processing unit 820 is transformed into a special purpose microprocessor or machine. For example, the interface component, when executed by the processing unit 820, causes the processing unit 820 to identify a request to couple a wireless communication device to a wireless network including a plurality of packet data networks, and a connection component, when executed by the processing unit 820, causes the processing unit 820 to identify, from the plurality of packet data networks, a packet data network associated with the request, and use an access point name corresponding to the packet data network to decouple the wireless communication device from the wireless network and/or couple the wireless communication device to the wireless network. Although the processing unit 820 is shown separate from the system memory 825, embodiments of the disclosure contemplate that the system memory 825 may be onboard the processing unit 820 such as in some embedded systems.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 842 that reads from or writes to a removable, nonvolatile magnetic disk 843 (e.g., a floppy disk, a tape cassette), and an optical disk drive 844 that reads from or writes to a removable, nonvolatile optical disk 845 (e.g., a compact disc (CD), a digital versatile disc (DVD)). Other removable/non-removable, volatile/nonvolatile computer storage media that may be used in the example operating environment include, but are not limited to, flash memory cards, digital video tape, solid state RAM, solid state ROM, and the like. The hard disk drive 841 may be connected to the system bus 830 through a non-removable memory interface such as interface 846, and magnetic disk drive 842 and optical disk drive 844 may be connected to the system bus 830 by a removable memory interface, such as interface 847.

The drives and their associated computer storage media, described above and illustrated in FIG. 8, provide storage of computer-readable instructions, data structures, program modules and other data for the computer 810. In FIG. 8, for example, hard disk drive 841 is illustrated as storing operating system 854, application programs 855, other program modules 856 and program data 857. Note that these components may either be the same as or different from operating system 834, application programs 835, other program modules 836, and program data 837. Operating system 854, application programs 855, other program modules 856, and program data 857 are given different numbers herein to illustrate that, at a minimum, they are different copies.

The computer 810 includes a variety of computer-readable media. Computer-readable media may be any available media that may be accessed by the computer 810 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. ROM 831 and RAM 832 are examples of computer storage media. Computer storage media are tangible and mutually exclusive to communication media. Computer storage media for purposes of this disclosure are not signals per se. Example computer storage media includes, but is not limited to, hard disks, flash drives, solid state memory, RAM, ROM, electrically erasable programmable read-only memory (EEPROM), flash memory or other memory technology, CDs, DVDs, or other optical disk storage, magnetic cassettes, magnetic tape, magnetic disk storage or other magnetic storage devices, or any other medium which may be used to store the desired information and which may accessed by the computer 810. Computer storage media are implemented in hardware and exclude carrier waves and propagated signals. Any such computer storage media may be part of computer 810.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user may enter commands and information into the computer 810 through one or more input devices, such as a pointing device 861 (e.g., mouse, trackball, touch pad), a keyboard 862, a microphone 863, and/or an electronic digitizer 864 (e.g., tablet). Other input devices not shown in FIG. 8 may include a joystick, a game pad, a controller, a satellite dish, a camera, a scanner, an accelerometer, or the like. These and other input devices may be coupled to the processing unit 820 through a user input interface 865 that is coupled to the system bus 830, but may be connected by other interface and bus structures, such as a parallel port, game port or a universal serial bus (USB).

Information, such as text, images, audio, video, graphics, alerts, and the like, may be presented to a user via one or more presentation devices, such as a monitor 866, a printer 867, and/or a speaker 868. Other presentation devices not shown in FIG. 8 may include a projector, a vibrating component, or the like. These and other presentation devices may be coupled to the processing unit 820 through a video interface 869 (e.g., for a monitor 866 or a projector) and/or an output peripheral interface 870 (e.g., for a printer 867, a speaker 868, and/or a vibration component) that are coupled to the system bus 830, but may be connected by other interface and bus structures, such as a parallel port, game port or a USB. In some examples, the presentation device is integrated with an input device configured to receive information from the user (e.g., a capacitive touch-screen panel, a controller including a vibrating component). Note that the monitor 866 and/or touch screen panel may be physically coupled to a housing in which the computer 810 is incorporated, such as in a tablet-type personal computer.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more local area networks (LAN) 882 and one or more wide area networks (WAN) 883, but may also include other networks. Such networking environments are commonplace in offices, enterprise-wide computer networks, intranets and the Internet.

When used in a LAN networking environment, the computer 810 is coupled to the LAN 882 through a network interface or adapter 884. When used in a WAN networking environment, the computer 810 may include a modem 885 (e.g., wireless component 220) or other means for establishing communications over the WAN 883, such as the Internet. The modem 885, which may be internal or external, may be connected to the system bus 830 via the user input interface 865 or other appropriate mechanism. A wireless networking component such as comprising an interface and antenna may be coupled through a suitable device such as an access point or peer computer to a LAN 882 or WAN 883. In a networked environment, program modules depicted relative to the computer 810, or portions thereof, may be stored in the remote memory storage device. By way of example, and not limitation, FIG. 8 illustrates remote application programs 886 as residing on memory storage device 881. It may be appreciated that the network connections shown are examples and other means of establishing a communications link between the computers may be used.

The block diagram of FIG. 8 is merely illustrative of an example system that may be used in connection with one or more examples of the disclosure and is not intended to be limiting in any way. Further, peripherals or components of the computing devices known in the art are not shown, but are operable with aspects of the disclosure. At least a portion of the functionality of the various elements in FIG. 8 may be performed by other elements in FIG. 8, or an entity (e.g., processor, web service, server, applications, computing device, etc.) not shown in FIG. 8.

The subject matter described herein enables a computing device to automatically manage packet data access for wireless communication devices. The communication device may be selectively configured to use a single network or multiple networks for data transfers. For example, when configured to use a single network, the communication device controls network connections for data transfers to and/or from the communication device by decoupling the communication device from the network using a first access point name before coupling the communication device to the network using a second access point name. In some examples, the communication device is configured to seamlessly switch between a single network configuration and a multiple network configuration and/or between using a first access point name to couple the communication device to a network and using a second access point name to couple the communication device to the network or another network. When operating in the single network configuration, the communication device may control or restrict a creation of multiple network connections to facilitate controlling power and/or data consumption at the communication device and/or communications (e.g., data flow) between the communication device and the network. In this manner, the communication device may be configured to manage a consumption of power, data, and/or bandwidth in a calculated and systematic manner for increased performance.

Although described in connection with an example computing system environment, examples of the disclosure are capable of implementation with numerous other general purpose or special purpose computing system environments, configurations, or devices. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. Examples of the disclosure may also be practiced in distributed computing environments where tasks are performed by remote processing devices that are linked through a communications network. In a distributed computing environment, program modules may be located in local and/or remote computer storage media including memory storage devices.

The examples illustrated and described herein as well as examples not specifically described herein but within the scope of aspects of the disclosure constitute example means for managing network resources and/or example means for managing packet data access for communication devices. For example, the elements illustrated in FIGS. 1, 2, and/or 8, such as when encoded to perform the operations illustrated in FIGS. 3-7 constitute at least an example means for coupling a wireless communication device to a wireless network using a first access point name (e.g., wireless network 110, communication device 120, connection component 124, network core 130, air interface network 140, packet data network 150, wireless component 220, management entity 240, HSS 250, base station 260, serving entity 270, gateway entity 280); an example means for receiving a request to couple the wireless communication device to the wireless network using a second access point name (e.g., communication device 120, interface component 122, operating system 210, application component 230); an example means for determining whether the wireless communication device is selectively configured to use a single packet data network for data transfers (e.g., communication device 120, connection component 124, wireless component 220); and an example means for transmitting an instruction (e.g., communication device 120, connection component 124, wireless component 220).

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

As used herein, the terms "couple," "attach," and "connect" refer to any connection, coupling, link, or the like by which communications may be transmitted from one element to another element. "Coupled," "attached," or "connected" devices are not necessarily directly, mechanically, or physically connected to one another and may be separated by intermediate components or devices that may manipulate or modify the communications therebetween.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Alternatively or in addition to the other examples described herein, examples include any combination of the following:

receiving a request to couple a wireless communication device to a wireless network;

receiving a request to couple a wireless communication device to a wireless network using an access point name;

determining whether a wireless communication device is selectively configured to access a single packet data network for data transfers;

identifying an access point name;

selecting an access point name;

transmitting, to a packet data network, an instruction associated with decoupling a wireless communication device from a wireless network;

decoupling a wireless communication device from a wireless network;

receiving an indication from a wireless network;

receiving an indication generated at a packet data network, the indication associated with a satisfied status;
receiving an indication associated with a wireless communication device being decoupled from the wireless network;
identifying a packet data network as an inactive packet data network;
initiating coupling a wireless communication device to a wireless network;
transmitting, to a wireless network, an instruction associated with coupling a wireless communication device to the wireless network;
transmitting, to a packet data network, an instruction associated with coupling a wireless communication device to a wireless network;
transmitting, to a packet data network, an instruction associated with coupling a wireless communication device to a wireless network using an access point name;
transmitting, to a packet data network, an instruction associated with coupling a wireless communication device to a wireless network using an access point name in addition to using another access point name;
coupling a wireless communication device to a wireless network;
coupling a wireless communication device to a wireless network using an access point name;
coupling a wireless communication device to a wireless network using an access point name in addition to using another access point name;
identifying a packet data network as an active packet data network;
receiving an indication generated at a packet data network, the indication associated with a status other than a satisfied status;
determining whether a quantity of attempts satisfies a predetermined threshold;
increasing a quantity of attempts;
decreasing a quantity of attempts
determining whether a packet data network is associated with an access point name;
determining whether an access point name is associated with a default access point name;
an interface component that identifies a request to couple a wireless communication device to a wireless network including a plurality of packet data networks;
a connection component that communicates with an interface component to identify, from a plurality of packet data networks, a packet data network associated with a request;
a connection component that uses an access point name associated with a packet data network to decouple a wireless communication device from a wireless network;
a connection component that uses an access point name associated with a packet data network to couple a wireless communication device to a wireless network;
a connection component selectively configurable between a single packet data network configuration and a multiple packet data networks configuration;
a wireless communication device coupleable to a single packet data network when a connection component is selectively configured to be in a single packet data network configuration; and
a wireless communication device coupleable to multiple packet data networks when a connection component is selectively configured to be in a multiple packet data networks configuration.

In some examples, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

What is claimed is:

1. A computer-implemented method for managing network resources, the method comprising:
coupling a wireless communication device to a wireless network using a first access point name, the wireless communication device capable of communicating with a single packet data network or multiple packet data networks;
receiving, at the wireless communication device, a request to couple the wireless communication device to the wireless network using a second access point name different from the first access point name;
determining whether the wireless communication device is selectively configured to use the single packet data network in a single packet data network configuration for data transfers or to use the multiple packet data networks in a multiple packet data network configuration for data transfers;
on condition that the wireless communication device is operating using the single packet data network in the single packet data network configuration based on a determination that an operating system or application of the wireless communication device is capable of using only one packet data network at a time, transmitting, to a first packet data network corresponding to the first access point name, a first instruction, and transmitting, to a second packet data network corresponding to the second access point name, a second instruction, the first instruction associated with decoupling the wireless communication device from the wireless network, and the second instruction associated with coupling the wireless communication device to the wireless network using the second access point name, the wireless network including the first packet data network and the second packet data network; and
restricting concurrent use of multiple packet data networks in the single packet data network configuration.

2. The method of claim 1, further comprising, on condition that the wireless communication device is configured to access the multiple packet data networks, transmitting, to the second packet data network, a third instruction associated with coupling the wireless communication device to the wireless network using the second access point name in addition to using the first access point name.

3. The method of claim 1, further comprising:
receiving, at the wireless communication device, an indication generated at one of the first packet data network and the second packet data network, the indication associated with a satisfied status; and based on the received indication, identifying the one of the first packet data network and the second packet data network as an active packet data network.

4. The method of claim 1, further comprising:
receiving, at the wireless communication device, a first indication generated at the first packet data network, the first indication associated with a satisfied status of a successful detachment from the first packet data network;
based on the received first indication, identifying the first packet data network as an inactive packet data network, wherein the second instruction is transmitted to the second packet data network upon identifying the first packet data network as the inactive packet data network;
receiving, at the wireless communication device, a second indication generated at the second packet data network, the second indication associated with a satisfied status of a successful network connection to the second packet data network; and
based on the received second indication, identifying the second packet data network as an active packet data network.

5. The method of claim 1, further comprising:
receiving, at the wireless communication device, an indication generated at one of the first packet data network and the second packet data network, the indication associated with a status other than a satisfied status; and
based on the received indication, transmitting, to the one of the first packet data network and the second packet data network, a third instruction associated with coupling the wireless communication device to the wireless network.

6. The method of claim 1, further comprising:
receiving, at the wireless communication device, an indication generated at one of the first packet data network and the second packet data network, the indication associated with a status other than a satisfied status;
based on the received indication, determining whether a quantity of attempts satisfies a predetermined threshold; and
on condition that the quantity of attempts does not satisfy the predetermined threshold, increasing the quantity of attempts, and transmitting, to the one of the first packet data network and the second packet data network, a third instruction associated with coupling the wireless communication device to the wireless network.

7. The method of claim 1, further comprising:
receiving, at the wireless communication device, an indication generated at one of the first packet data network and the second packet data network, the indication associated with a status other than a satisfied status at the one of the first packet data network and the second packet data network;
based on the received indication, determining whether the one of the first packet data network and the second packet data network corresponds to a third access point name; and
on condition that both the first packet data network and the second packet data network correspond to an access point name other than the third access point name, transmitting, to a packet data network corresponding to the third access point name, a third instruction associated with coupling the wireless communication device to the wireless network using the third access point name.

8. The method of claim 1, further comprising:
receiving, at the wireless communication device, an indication generated at one of the first packet data network and the second packet data network, the indication associated with a status other than a satisfied status at the one of the first data packet network and the second packet data network;
based on the received indication, determining whether the one of the first packet data network and the second packet data network corresponds to a third access point name; and
on condition that both the first packet data network and the second packet data network correspond to an access point name other than the third access point name, decreasing a quantity of attempts, selecting the third access point name, and transmitting, to a packet data network corresponding to the third access point name, a third instruction associated with coupling the wireless communication device to the wireless network using the third access point name.

9. The method of claim 1, further comprising:
receiving, at the wireless communication device, an indication generated at one of the first packet data network and the second packet data network, the indication associated with a status other than a satisfied status;
based on the received indication, selecting a third access point name; and
transmitting, to a packet data network corresponding to the third access point name, a third instruction associated with coupling the wireless communication device to the wireless network using the third access point name.

10. The method of claim 1, further comprising:
receiving, at the wireless communication device, an indication generated at one of the first packet data network and the second packet data network, the indication associated with a status other than a satisfied status; and
based on the received indication, transmitting, to another wireless network, a third instruction associated with coupling the wireless communication device to the other wireless network.

11. The method of claim 1, further comprising:
receiving, at the wireless communication device, an indication generated at one of the first packet data network and the second packet data network, the indication associated with a status other than a satisfied status;
based on the received indication, determining whether the one of the first packet data network and the second packet data network corresponds to a third access point name; and
on condition that the one of the first packet data network and the second packet data network corresponds to the third access point name, transmitting, to another wireless network, a third instruction associated with coupling the wireless communication device to the other wireless network.

12. A wireless communication device comprising:
a memory device that stores data associated with a plurality of access point names, and computer-executable instructions; and
a processor that executes the computer-executable instructions to:
receive a request to couple the wireless communication device to a wireless network, the wireless communication device coupled to the wireless network using a first access point name of the plurality of access point names, the wireless communication device capable of communicating with a single packet data network or multiple packet data networks;

determine whether the wireless communication device is selectively configured to use the single packet data network in a single packet data network configuration for data transfers or to use the multiple packet data networks in a multiple packet data network configuration for data transfers; and on condition that the wireless communication device is operating using the single packet data network in the single packet data network configuration based on a determination that an operating system or application of the wireless communication device is capable of using only one packet data network at a time, decouple the wireless communication device from the wireless network, couple the wireless communication device to the wireless network using a second access point name of the plurality of access point names, and restrict concurrent use of multiple packet data networks in the single packet data network configuration.

13. The computing device of claim 12, wherein the processor is configured to execute the computer-executable instructions to identify the second access point name and in the single packet data network configuration, the wireless communication device is only attachable to at most one packet data network at a time and in the multiple packet data network configuration, the communication device is attachable to multiple packet data networks at a time, the single packet data network configuration restricting concurrent use of multiple packet data networks in the single packet data network configuration by restricting creation of multiple network connections, the processor further configured to execute the computer-executable instructions to select the single packet data network configuration on condition that the application transmitting from the wireless communication device is configured to use only one packet data network connection at a time.

14. The computing device of claim 12, wherein the processor is configured to execute the computer-executable instructions to, on condition that the wireless communication device is configured to access the multiple packet data networks, couple the wireless communication device to the wireless network using the second access point name in addition to using the first access point name.

15. The computing device of claim 12, wherein the processor is configured to execute the computer-executable instructions to:
receive an indication from the wireless network; and
based on the received indication, determine whether the wireless communication device is coupled to the wireless network.

16. The computing device of claim 12, wherein the processor is configured to execute the computer-executable instructions to receive an indication associated with the wireless communication device being decoupled from the wireless network, wherein the wireless communication device is coupled to the wireless network using the second access point name upon receiving the indication.

17. The computing device of claim 12, wherein the processor is configured to execute the computer-executable instructions to:
determine whether a quantity of attempts associated with coupling the wireless communication device to the wireless network satisfies a predetermined threshold;
on condition that the quantity of attempts does not satisfy the predetermined threshold, increase the quantity of attempts, and initiate coupling the wireless communication device to the wireless network; and
on condition that the quantity of attempts satisfies the predetermined threshold, one of couple the wireless communication device to the wireless network using a default access point name of the plurality of access point names and couple the wireless communication device to another wireless network.

18. The computing device of claim 12, wherein the processor is configured to execute the computer-executable instructions to:
determine whether one or more of the first access point name and the second access point name is associated with a default access point name;
on condition that both the first access point name and the second access point name are associated with an access point name other than the default access point name, couple the wireless communication device to the wireless network using the default access point name; and
on condition that both the first access point name and the second access point name are associated with the default access point name, couple the wireless communication device to another wireless network.

19. One or more computer-readable memory devices having computer-executable instructions, the one or more computer-readable memory devices comprising:
an interface component that, upon execution by one or more processors, identifies a request to couple a wireless communication device to a wireless network including a plurality of packet data networks, the wireless communication device capable of communicating with a single packet data network or multiple packet data networks; and
a connection component that, upon execution by the one or more processors, communicates with the interface component to identify, from the plurality of packet data networks, a packet data network associated with the request, and uses an access point name corresponding to the packet data network to at least one of decouple the wireless communication device from the wireless network and couple the wireless communication device to the wireless network when the wireless communication device is in a single packet data network configuration based on a determination that an operating system or application of the wireless communication device is capable of using only one packet data network at a time, the wireless communication device coupleable to the single packet data network of the plurality of packet data networks when the connection component is selectively configured to be in the single packet data network configuration and restricted from concurrent use of multiple packet data networks in the single packet data network configuration.

20. The one or more computer-readable memory devices of claim 19, wherein the connection component is selectively configurable between the single packet data network configuration and a multiple packet data network configuration, the wireless communication device coupleable to multiple packet data networks of the plurality of packet data networks when the connection component is selectively configured to be in the multiple packet data networks configuration.

* * * * *